United States Patent
Kakimoto et al.

(10) Patent No.: US 7,633,384 B2
(45) Date of Patent: Dec. 15, 2009

(54) ALARM INFORMATION PROCESSING DEVICE AND ALARM INFORMATION PROCESSING METHOD

(75) Inventors: Mamoru Kakimoto, Musashino (JP); Yasunori Sakata, Musashino (JP); Naohito Ohtani, Musashino (JP); Yasunori Kobayashi, Musashino (JP)

(73) Assignee: Yokogawa Electric Corporation, Musashino-shi (JP)

( * ) Notice: Subject to any disclaimer, the term of this patent is extended or adjusted under 35 U.S.C. 154(b) by 349 days.

(21) Appl. No.: 11/650,436

(22) Filed: Jan. 8, 2007

(65) Prior Publication Data

US 2007/0171041 A1 Jul. 26, 2007

(30) Foreign Application Priority Data

Jan. 24, 2006 (JP) ............................. 2006-014523

(51) Int. Cl.
*G08B 29/00* (2006.01)
*G05B 11/01* (2006.01)

(52) U.S. Cl. ..................... 340/506; 340/521; 340/525; 700/9; 700/17

(58) Field of Classification Search .................. 340/506
See application file for complete search history.

(56) References Cited

U.S. PATENT DOCUMENTS 7,250,856 B2 * 7/2007 Havekost et al. ............ 340/517

2002/0002414 A1 * 1/2002 Hsiung et al. ................ 700/95
2005/0225441 A1 10/2005 Kernan

FOREIGN PATENT DOCUMENTS

JP 2002-222012 A 8/2002

OTHER PUBLICATIONS

European Search Report dated May 23, 2007, issued in corresponding European patent application No. 07 00 0439.
Kevin T. Diamond et al., "Best Practices in Alarm Management—Experience from the Field", Cast Communications—Special Issue on it, 2004, pp. 1-8.
"Alarm & Event Management: ProcessGuard System Components", Matrikon, Jan. 2004, pp. 1-4.

* cited by examiner

*Primary Examiner*—Donnie L Crosland
(74) *Attorney, Agent, or Firm*—Westerman, Hattori, Daniels & Adrian, LLP

(57) ABSTRACT

There are provided an alarm information processing device and an alarm information processing method capable of handling alarm information in unification and of exhibiting flexible adaptability in response to the circumstances. A collection unit collects alarm information having a plurality of mixed formats. A normalization unit normalizes alarm information collected by the collection unit. An information processing unit executes information processing relative to the alarm information normalized by the normalization unit. A user setting unit is used for setting a logic for normalization by a user in the normalization unit.

8 Claims, 4 Drawing Sheets

FIG. 3
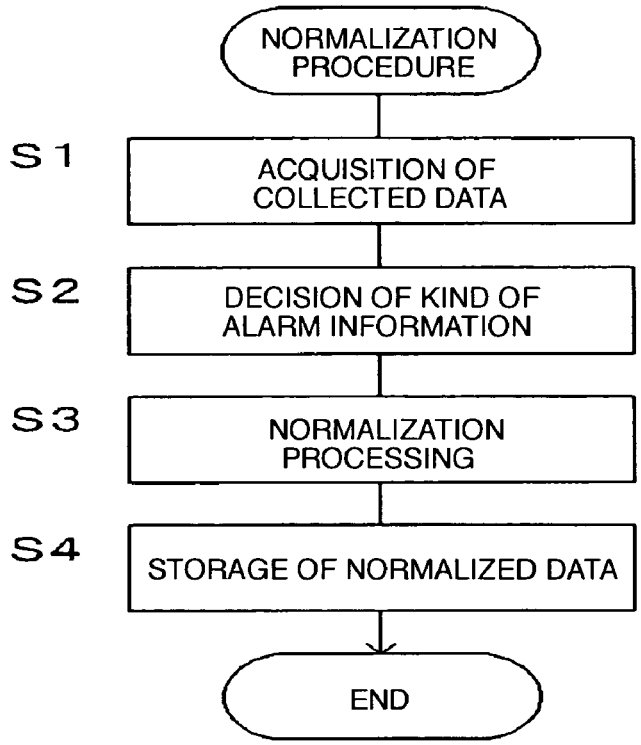
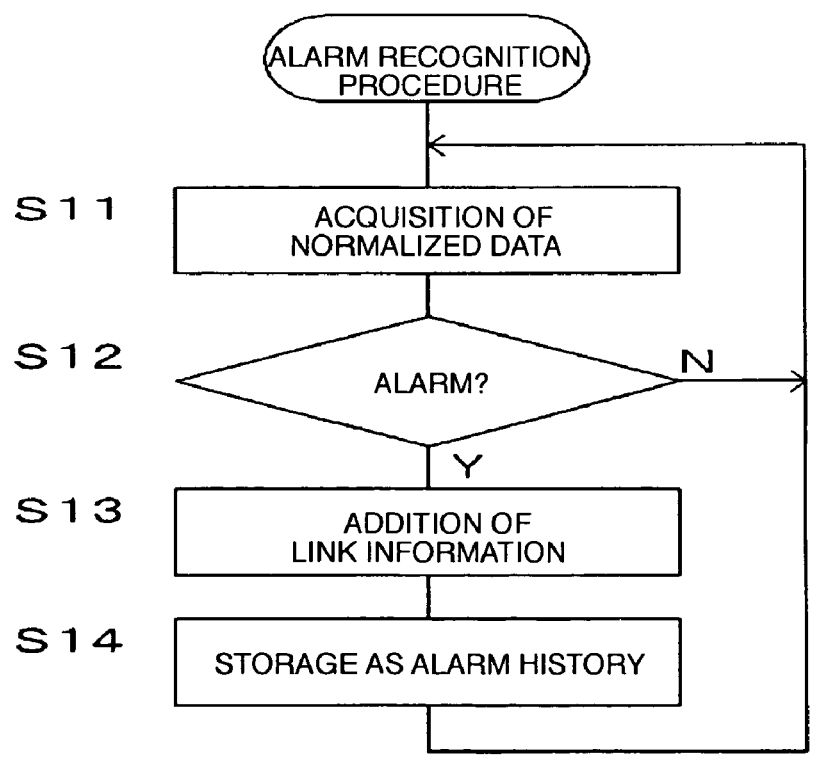

FIG. 4
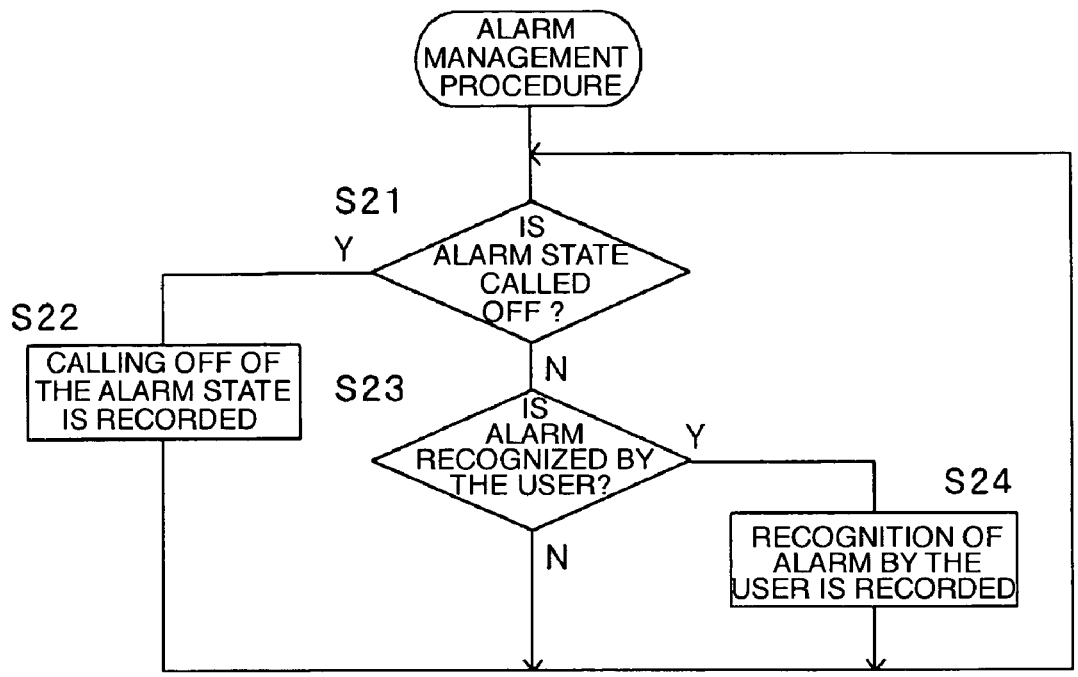
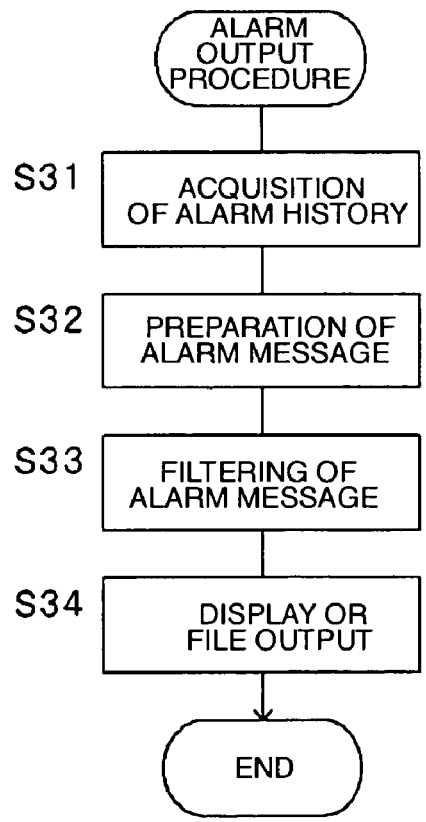

ALARM INFORMATION PROCESSING DEVICE AND ALARM INFORMATION PROCESSING METHOD

FIELD OF THE INVENTION

The invention relates to an alarm information processing device and an alarm information processing method capable of handling collected alarm information, and in particular, to an alarm information processing device and alarm information processing method capable of handling alarm information in unification.

BACKGROUND OF THE INVENTION

Production facilities of a plant are normally structured by extensive devices and systems such as field equipment, a controller or a programmable controller for controlling the field equipment, and so forth. Further, the plant is provided with a safety system for ensuring the safety of the plant, wherein the safety system generates an alarm when detecting abnormalities in the plant.

JP 2002-222012A discloses an invention wherein alarms of different categories are displayed on a single screen, and filtering of alarms is variably set.

As field equipment have been recently intelligible, respective field equipment per se have generated alarms. Further, as production facilities of a plant are complex, there is a tendency that a safety system becomes complex and multiplex. Safety of the plant has been conventionally ensured by separately displaying and managing the individual alarms generated from devices and systems.

However, since various alarm elements have been mixed in a plant, a problem has been encountered in that it becomes difficult to decide a priority of the importance of an alarm and so forth. In particular, in a development maker, or a plant having equipment and systems of different models which are mixed therein, various alarms can not be handled in unification, so that it becomes impossible to execute processing such as making an intelligent decision relative to the alarms in unification. Accordingly, there has been required a development of a system in which miscellaneous alarms are unified and presented, or in which various information processing are unified and executed relative to the alarms.

Meanwhile, equipment and systems constituting a plant are different from one another for every plant, and methods of handling alarms are different from one another in response to actual circumstances of the plant. Accordingly, it is necessary to set a method of unifying the alarms in response to the actual circumstances of the plant. Further, it is necessary to speedily respond to a case where equipment adopting an alarm of new model is introduced into a plant, and there is required a system capable of flexibly adapting to individual circumstances and variation in circumstances.

SUMMARY OF THE INVENTION

It is an object of the invention to provide an alarm information processing device and an alarm information processing method capable of handling alarm information in unification and of exhibiting flexible adaptability as circumstances demand.

The alarm information processing device of the first aspect of the invention is characterized in comprising a collection means for collecting alarm information having a plurality of mixed formats, a normalization means for normalizing alarm information collected by the collection means, and information processing means for executing information processing relative to the alarm information normalized by the normalization means.

According to the alarm information processing device, since collected alarm information is normalized, unific information processing can be executed relative to the alarm information.

The alarm information processing device may be provided with a user setting means for setting a logic for normalization by a user in the normalization means.

In this case, since the logic for normalization can be arbitrarily set by the user, the logic for normalization can be flexibly set in response to the individual circumstances and variation in circumstances.

Owing to the normalization of the alarm information by the normalization means, the importance of an alarm indicated by the alarm information may be unified.

The information processing means may execute processing for displaying or outputting alarm information normalized by the normalization means.

The alarm information processing method of the second aspect of the invention is characterized in comprising a step of collecting alarm information having plurality of mixed formats, a step of normalizing alarm information collected in the step of collecting alarm information, and a step of executing information processing relative to the alarm information normalized in the step of normalizing alarm information.

According to the alarm information processing method, since the collected alarm information is normalized, unific information processing can be executed relative to the alarm information.

The alarm information processing method may be provided with a step of setting a logic for normalization by a user.

In this case, since the logic for normalization can be arbitrarily set by the user, the logic for normalization can be flexibly set in response to the individual circumstances and variation in circumstances.

Owing to the normalization of alarm information, the importance of the alarm indicated by the alarm information may be unified.

In the step of executing information processing, processing for displaying or outputting normalized alarm information may be executed.

According to the alarm information processing device, since the collected alarm information is normalized, unific information processing can be executed relative to the alarm information.

According to the alarm information processing method, since the collected alarm information is normalized, unific information processing can be executed relative to the alarm information.

BRIEF DESCRIPTION OF THE DRAWINGS

FIG. 3 shows flowcharts showing operating procedures of the alarm information processing device according to the embodiment of the invention; and FIG. 4 shows flowcharts showing other operating procedures of the alarm information processing device according to the embodiment of the invention.

BEST MODE FOR CARRYING OUT THE INVENTION

Figure 1:
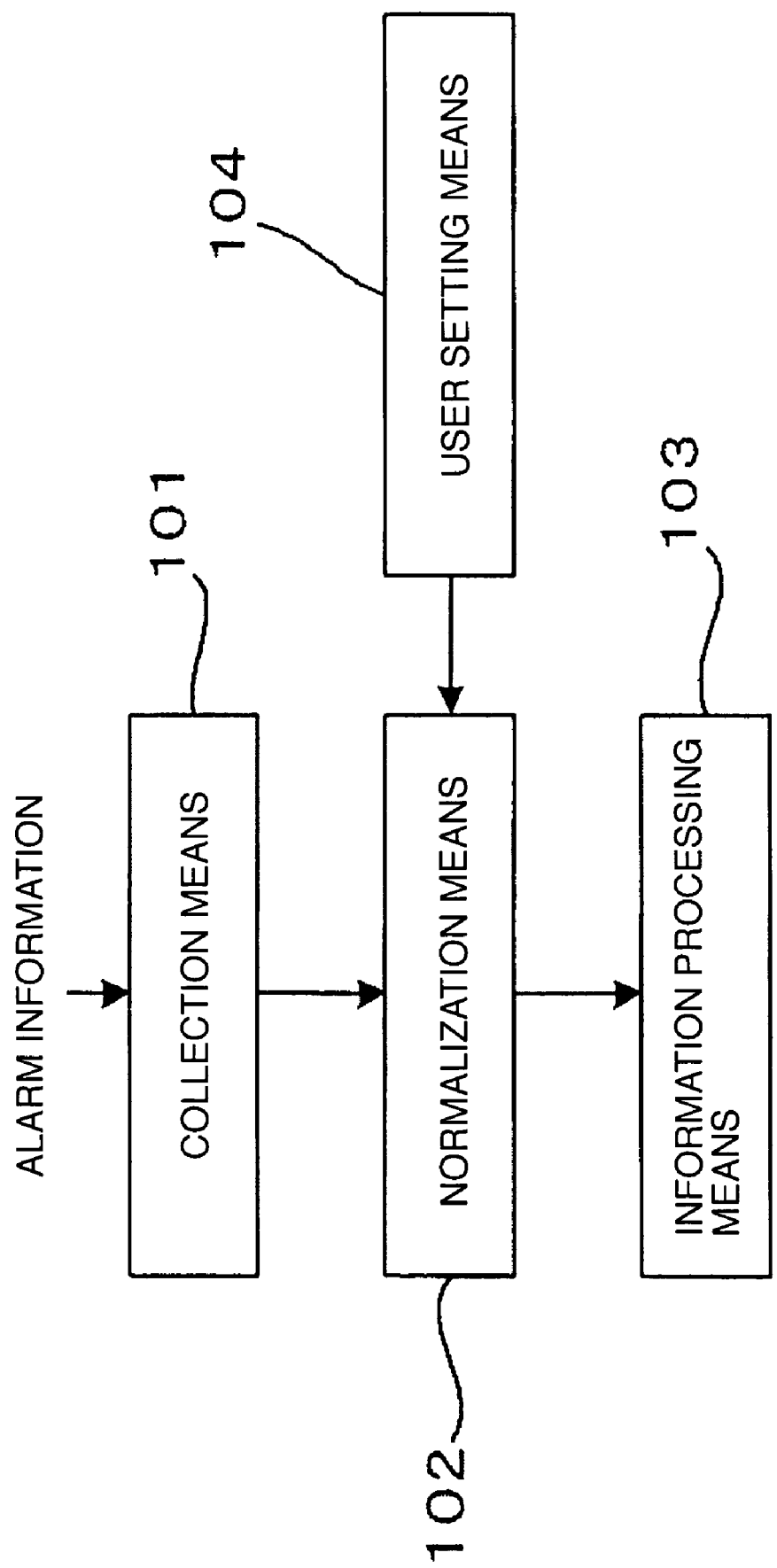
FIG. 1 is a block diagram functionally showing an alarm information processing device according to the invention.

FIG. 1 is a block diagram functionally showing an alarm information processing device according to the invention.

In FIG. 1, a collection means 101 collects alarm information having a plurality of mixed formats. A normalization means 102 normalizes alarm information collected by the collection means 101. An information processing means 103 executes information processing relative to the alarm information normalized by the normalization means 102.

A user setting means 104 is used for a user to set a logic for normalization in the normalization means 102.

An embodiment of the alarm information processing device according to the invention is described hereinafter with reference to FIG. 2 to FIG. 4.

Figure 2:
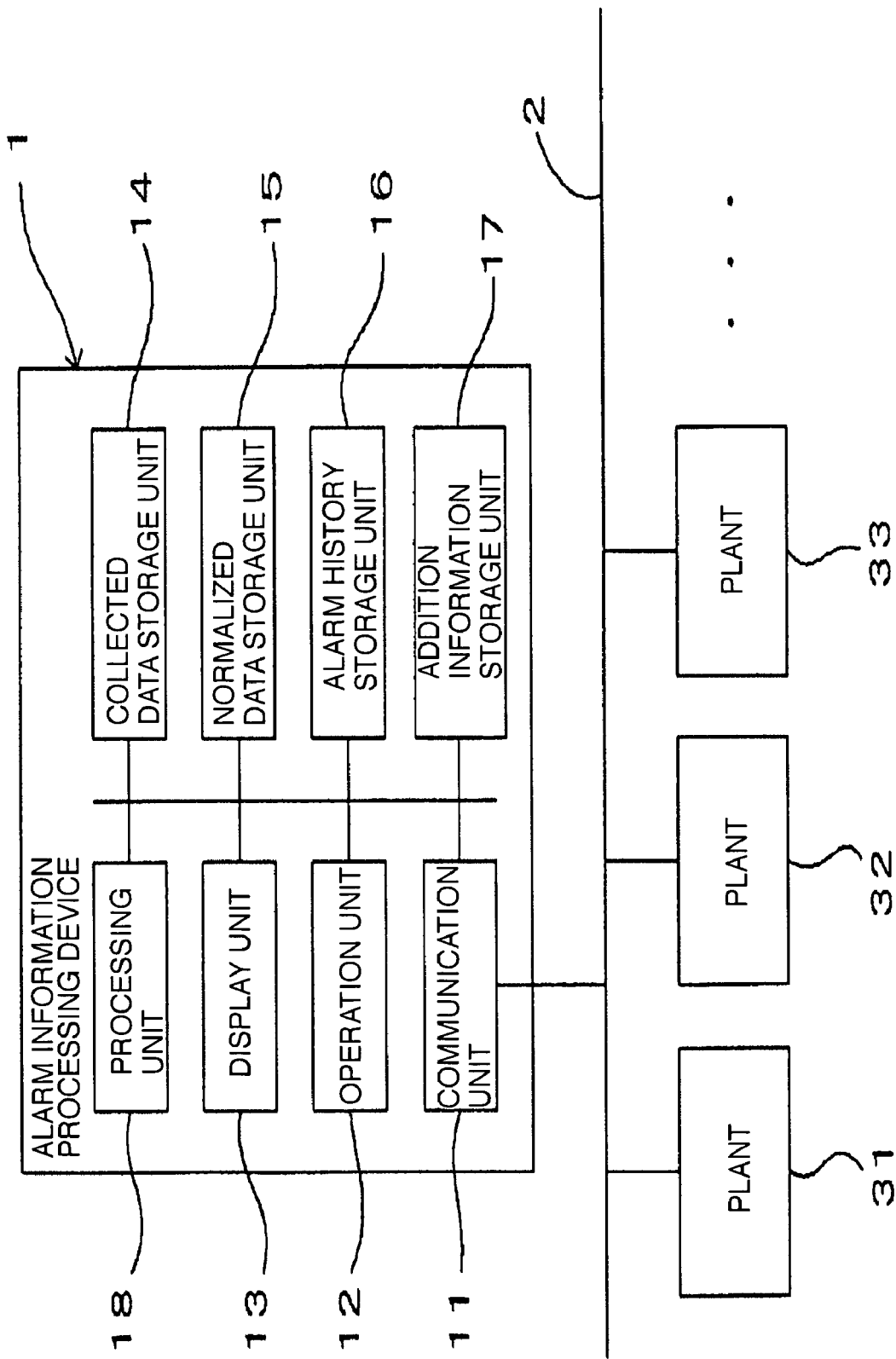
FIG. 2 is a block diagram showing a configuration of the alarm information processing device according to an embodiment of the invention.

FIG. 2 is a block diagram showing a configuration of the alarm information processing device according to the embodiment of the invention.

As shown in FIG. 2, an alarm information processing device 1 of the invention comprises a communication unit 11 connected to a network 2, an operation unit 12 for receiving a user's operation, a display unit 13 for displaying alarm information relative to the user, a collected data storage unit 14 for storing data collected via the network 2, a normalized data storage unit 15 for storing the normalized data, an alarm history storage unit 16 for storing an alarm history, an addition information storage unit 17 for storing additional data to be displayed while added to the alarm information, and a processing unit 18 for controlling various processing in the alarm information processing device 1.

Further, as shown in FIG. 2, the alarm information processing device 1 receives messages from plants 31, 32, 33, ... connected to the network 2. These messages from the plants are received by the alarm information processing device 1 via the communication unit 11, and they are sequentially stored in the collected data storage unit 14 as raw data. These messages comprise a plurality of mixed formats and they are stored in the collected data storage unit 14 in a state where a plurality of formats are mixed.

FIG. 3 and FIG. 4 are flowcharts showing operating procedures of the alarm information processing device according to the embodiment of the invention.

Step S1 to Step S3 of FIG. 3 show a procedure or program of processing for normalizing messages. This procedure is executed on the basis of the control of the processing unit 18.

In Step S1 of FIG. 3, a given message is acquired from the collected data storage unit 14.

Subsequently, in Step S2, a kind of the acquired message is decided, for example, it is decided as to whether what kind of equipment of which plant the acquired message is derived from or a data format of the message is decided.

Subsequently, in Step S3, the message is normalized in accordance with a given logic in response to the kind of message.

In the normalization processing, the formats of a plurality of mixed messages are unified by executing a given logic. For example, in the case where in a specific system used in the plant where the importance of an alarm is defined by a numerical value, while in a different system where the importance of the alarm is indicated by a stepwise category of alarm, the importance of the alarm is unified into one scale. Further, the formats of data are unified into one format so that the contents of all the messages can be decided.

According to the embodiment, the logic for normalization processing of the message is set by a user. A method of setting a logic will be described later.

Next, in Step S4, normalized data (message) generated by the normalization processing is stored in the normalized data storage unit 15, thereby completing the procedure.

Step S11 to Step S14 of FIG. 3 show a procedure or program of alarm recognition processing. This procedure is executed on the basis of the control of the processing unit 18.

In Step S11 of FIG. 3, the normalized data is acquired from the normalized data storage unit 15. Subsequently, in Step S12, it is decided as to whether the normalized data thus acquired is a message indicating alarm information or not. If the decision is affirmed, the program goes to Step S13, while if the decision is denied, the program returns to Step S11.

In Step S13, there is added link information relative to addition data to be added to the alarm information, and in Step S14, and the alarm information and the link information are stored in the alarm history storage unit 16 as the alarm history, then the program returns to Step S11.

Step S21 to Step S26 of FIG. 4 show a procedure or program of alarm management processing. This procedure is executed on the basis of the control of the processing unit 18.

In Step S21 of FIG. 4, regarding the alarm information stored in the alarm history storage unit 16 (Step 14), it is decided as to whether an alarm state is called off or not on the basis of the message stored in the normalized data storage unit 15. If this decision is affirmed, the program goes to Step S22 while if the decision is denied, the program goes to Step S23.

In Step S22, calling off of the alarm state is recorded in the alarm history storage unit 16 as a part of the alarm history, then the In Step S23, it is decided as to whether a generated alarm was recognized or not by the user. This decision is executed on the basis of the presence of the recognition operation of the alarm relative to the operation unit 12. The user who recognized generation of the alarm specifies the alarm relative to the operation unit 12, and is able to implement a given recognition operation for notifying the recognition of the alarm. If the operation unit 12 receives the user's operation, the decision in Step S23 is to be affirmed. If the decision in Step S23 is affirmed, the program goes to Step S24 while if the decision is denied, the program returns to Step S21.

In Step 24, the fact of recognition of the specific alarm by the user is recorded in the alarm history storage unit 16 as a part of the alarm history, and the program returns to Step S21.

Step S31 to Step S34 of FIG. 4 show a procedure or program of alarm output processing. This procedure is executed on the basis of the control of the processing unit 18 in accordance with the user's operation relative to the operation unit 12.

In Step S31 of FIG. 4, the alarm history is acquired from the alarm history storage unit 16.

Subsequently, in Step S32, an alarm message is prepared on the basis of the alarm history thus acquired. The alarm information which was recorded in the alarm history is reflected on the alarm message. Further, addition data is acquired from the addition information storage unit 17 on the basis of the link information which was recorded as the alarm history, and it is reflected on the alarm message.

Next, in Step S33, filtering of the alarm message is implemented in accordance with the use's operation relative to the operation unit 12, as needed.

Subsequently, in Step S34, the alarm message extracted by filtering is displayed on the display unit 13 or subjected to a file output, thereby completing the procedure. Meanwhile, in Step S34, the user can specify the display items and display order of the alarm message by operating the operation unit 12.

Further, according to the present embodiment, in addition to the procedures shown in FIG. 3 and FIG. 4, the processing unit 18 executes grouping of the alarms defined by the user, and executes processing such as a logical decision and so forth so that the result of execution of the procedure is reflected on the display of the alarm message or on the file output of the alarm message. Such a procedure includes processing such as suppression and so forth so as to display the alarm message relative to a specific alarm alone of the plurality of alarms which are, for example, certainly generated while interlocked with each other.

Described next is a method of setting the logic for normalization processing of the message.

As mentioned above, according to the present embodiment, the logic for normalization processing can be set by the user. Accordingly, the user can arbitrarily set a rule for handling in unification the messages issued from a plurality of systems and field equipment which are different in makers and formats.

For example, it is possible to unify the importance of an alarm into a standard adopted by a system of a specific maker, or the importance of all the alarms can be unified into a standard newly prepared by a user side.

Supposing that a system wherein the importance of an alarm is presented by a numerical value and a system wherein the importance of the alarm is indicated by a stepwise category of alarm are mixed, these systems can be unified into one system. For example, in the case where the systems are unified into one system, it is possible to set a logic so as to covert the importance of the alarm into "urgent alarm" if the importance is not less than 800, "critical alarm" if the importance is not less than 600, "middle alarm" if the importance is not less than 400, and "minor alarm" if the importance is less than 400.

The user prepares a logic for normalization processing by operating the operation unit 12. For example, the user can describe this logic with ease by use of a general-purpose script language (Java (registered trademark) Script, VBScript, Perl and so forth). The described logic is stored in the processing unit 18 and this logic is used in the normalization processing (step S3).

As mentioned above, according to the present embodiment, since the various messages are unified by the normalization processing, alarm information can be properly presented in accordance with the importance of an alarm. Further, since the alarm information can be handled in unification by the normalization processing, information processing relative to the alarm information can be executed in unification.

Further, according to the present embodiment, since the logic for normalization processing can be set by the user, a suitable processing procedure can be at all times executed in response to the circumstances of the plant and variation in circumstances. It is difficult for a developer side of the alarm information processing device to grasp details of equipment and systems used in the plant with accuracy. For example, it is generally difficult to acquire information relating to alarms of the systems of other companies. Still further, it is difficult to speedily deal with a case where new equipment is introduced into the plant.

However, according to the present embodiment, since the user can arbitrarily set and change a logic for normalization processing, flexible and speedy dealing can be implemented. For example, in the case where new equipment is introduced into the plant to output a massage in a new format, it is possible to speedily respond to the massage in the new format by changing or adding the logic by the user. Further, since the user normally knows the details of the content of the message (packet) outputted by equipment or systems handled by himself or herself, it is possible to properly set a logic. Still further, since the user can freely set and change the priority between alarms, the importance of the alarms, and a method of displaying alarms, and so forth, it is possible to construct a system with ease which is convenient to use by the user.

As mentioned above, according to the alarm information processing device of the invention, since the collected alarm information is normalized, it is possible to execute unific information processing relative to the alarm information. Further, in the case where the logic for normalization processing can be arbitrarily set by the user, it is possible to flexibly set the logic for normalization processing in response to the individual circumstances and variation in circumstances.

The scope of the application of the invention is not limited to the foregoing embodiment. The invention can be widely applied to an alarm information processing device and an alarm information processing method for handling collected alarm information.

What is claimed is:

1. An alarm information processing device comprising:
a collection means for collecting alarm information having a plurality of mixed formats;
a normalization means for normalizing the alarm information collected by the collection means; and
an information processing means for executing information processing relative to the alarm information normalized by the normalization means.

2. The alarm information processing device according to claim 1, further comprising a user setting means for setting a logic for normalization by a user in the normalization means.

3. The alarm information processing device according to claim 1, wherein owing to the normalization of the alarm information by the normalization means, the importance of an alarm indicated by the alarm information is unified.

4. The alarm information processing device according to claim 1, wherein the information processing means executes processing for displaying or outputting the alarm information normalized by the normalization means.

5. An alarm information processing method comprising:
a step of collecting alarm information having a plurality of mixed formats;
a step of normalizing the alarm information collected in the step of collecting alarm information; and
a step of executing information processing relative to the alarm information normalized in the step of normalizing alarm information.

6. The alarm information processing method according to claim 5, further comprising a step of setting a logic for normalization by a user.

7. The alarm information processing method according to claim 5, wherein owing to the normalization of the alarm information, the importance of an alarm indicated by the alarm information is unified.

8. The alarm information processing method according to claim 5, wherein in the step of executing information processing, processing for displaying or outputting normalized alarm information is executed.

* * * * *